United States Patent Office 3,639,655
Patented Feb. 1, 1972

3,639,655
PREPARATION OF HYDROXY-SUBSTITUTED
POLYESTERS
Faber B. Jones, Bartlesville, Okla., assignor to
Phillips Petroleum Company
No Drawing. Filed Mar. 21, 1969, Ser. No. 809,395
Int. Cl. C08g 17/007, 33/10
U.S. Cl. 260—47 C
9 Claims

ABSTRACT OF THE DISCLOSURE

Theromplastic hydroxy-substituted polyesters are prepared by reacting a diepoxide with a dicarboxylic acid in the presence of a polar organic solvent and a basic catalyst.

This invention relates to a method for producing hydroxy-substituted polyesters.

It is known to one skilled in the art that hydroxy-substituted polyesters can be produced by reacting dicarboxylic acids with epoxy resins. However, substantial gelation difficulties are encountered during polymer formation.

It has now been discovered that hydroxy-substituted polyesters can be produced by reacting dicarboxylic acids and diepoxides in the presence of a polar organic solvent and a basic catalyst. High yields of gel-free polymers are obtained according to the process of this invention.

Accordingly, it is an object of this invention to provide a process for producing hydroxy-substituted polyesters.

Other objects, advantages, and features of this invention will be apparent to one skilled in the art from the following disclosure and claims.

The diepoxides and the dicarboxylic acids that can be employed in this invention are well known in the art. For example, see columns 3–4 of U.S. Pat. 3,256,226. Generally, the diepoxide has the formula

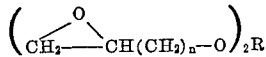

wherein $n$ is an integer from 1 to 10 and R is a divalent organic radical which is derived from dihydroxy compounds selected from dihydric phenols, alkane diols, and polyalkane diols. For example, the diepoxide can be produced by the condensation of a halo-substituted monoepoxide and a dihydroxy compound. The diepoxide is essentially free of substituent which would react with its own epoxy groups. The diepoxide is essentially free of substituents capable of reacting with a —COOH radical other than hydroxyl radicals and epoxy groups.

Where the dihydric phenols are selected, the diepoxide has the general formula

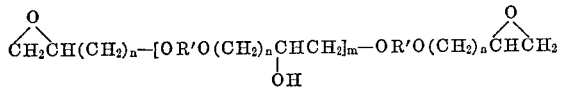

wherein $n$ is an integer from 1 to 10, $m$ is an integer from 0 to 20, and R' is a divalent organic radical derived from a dihydric phenol. When derived from polycyclic dihydric phenols, R' has the formula

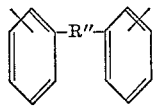

wherein R'' is a carbon-to-carbon bond, a divalent aliphatic radical, or a divalent aromatic radical. The divalent organic radical R' also can be

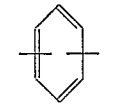

or

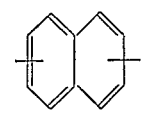

The aromatic rings can be ring-substituted with lower alkyl groups and halogens.

A specific example of a diepoxide that can be employed in this invention is diglycidyl ether of 4,4'-isopropylidenediphenol. Some other examples of diepoxides which can be used include diglycidyl ethers of dihydric substances such as hydroquinone, resorcinol, catechol, methylhydroquinone, 4-chlororesorcinol, p,p'-biphenol, 4,4'-methylenediphenol, 4,4'-isopropylidenedi-o-cresol, 3,3'-ethylidenediphenol, 1,5-naphthalenediol, 1,4-cyclohexanediol, 1,6-hexanediol, and 1,12-dodecanediol, as well as diglycidyl ethers which are higher condensation products of such dihydric substances with epichlorohydrin, and mixtures thereof.

Generally, the carboxylic acid has the formula R'''(COOH)$_2$ wherein R''' is a carbon-to-carbon bond, a divalent saturated aliphatic radical, a divalent ethylenically unsaturated aliphatic radical, a divlent aromatic radical, or a divalent halogenated aromatic radical.

Specific dicarboxylic acids include phthalic acid, isophthalic acid, terephthalic acid, maleic acid, fumaric acid, succinic acid, adipic acid, sebacic acid, allylsuccinic acid, and oxalic acid, and their halogenated derivatives such as tetrachlorophthalic acid, tetrabromophthalic acid, and the like. Also applicable is C$_{36}$ dimer acid derived from naturally occurring C$_{18}$ fatty acid. Also, to be included are mixtures of dicarboxylic acids, e.g., a mixture of allylsuccinic acid and isophthalic acid. If desired, the dicarboxylic acid can be produced in situ by reaction of the corresponding anhydride with water.

The polar organic solvents that can be employed in this invention are well known in the art. The polar organic solvent is one that substantially dissolves both the diepoxide and the dicarboxylic acid. The polar organic solvent can also be aprotic, that is a solvent that neither loses a proton to the solute, nor gains a proton from the solute. Preferably, this solvent is an acyclic or cyclic saturated sulfone having 2 to 10 carbon atoms or an acyclic or cyclic saturated N,N-disubstituted amide having 3 to 10 carbon atoms. Examples of some applicable polar organic solvents are dimethyl sulfone, diethyl sulfone, methyl ethyl sulfone, diisopropyl sulfone, dipentyl sulfone, sulfolane, 2-methylsulfolane, 3-methylsulfolane, 2-ethylsulfolane, 3-isopropylsulfolane, 2,3-dipropylsulfolane, N,N-dimethylformamide, N,N - diethylacetamide, N - methyl-N-octylformamide, N,N-diisopropylpropionamide, N,N-dimethyloctanamide, N-methyl-2-azetidinone, N-methyl-2-pyrrolidone, N - ethyl - 2 - piperidone, N-methylcaprolactam, N-hexyl-2-pyrrolidone, N-isopropyl-4-methyl-2-pyrrolidone, and the like, and mixtures thereof.

The basic catalysts that can be employed in this invention are also well known to the art. Although the basic catalysts can be a tertiary amine such as triethylamine or tributylamine, an alkali metal hydroxide such as sodium hydroxide or potassium hydroxide is preferred.

The reaction conditions of this invention can vary widely. Generally, the reaction is conducted at temperatures ranging from 50 to 250° C., preferably from 100° to 180° C. The time for reaction depends in part upon the temperature and ranges from less than 5 minutes to more than 24 hours, preferably from 30 minutes to 6 hours. The pressure need be only sufficient to maintain the reaction mixture in the liquid phase.

The amounts of the different constituents employed in this invention can vary widely. Generally, the mole ratio of diepoxide to dicarboxylic acid ranges from 0.95:1 to 1.05:1, preferably 0.98:1 to 1.02:1. Generally, the amount, by weight, of polar organic solvent employed is 0.8 to 12 times, preferably 1.5 to 8 times, the combined weight of diepoxide and dicarboxylic acid. Approximately 0.5 to 2 percent by weight of the basic catalyst is employed, based on the combined weight of the diepoxide and the dicarboxylic acid.

In the preparation of the hydroxy-substituted polyester, there can be numerous variations in the charging procedure. Generally, the reaction is carried out in an inert atmosphere such as nitrogen. Usually the dicarboxylic acid is admixed with the polar organic solvent first. Then the basic catalyst is added followed by the diepoxide. Preferably, the diepoxide is admixed with additional polar organic solvent prior to addition to the reaction mixture, which is usually done in increments over a period of time. The polyester can be recovered by precipitation, e.g., by pouring the reaction mixture into cold water and then drying the final product.

The present polyesters are useful as adhesives, coatings, and the like. For example, the thermoplastic resins produced can be readily crosslinked to give thermoset resins, e.g., in coating operations. The thermoplastic resins can be cured by heating with polyisocyanates such as tolylene diisocyanates, diphenylmethane diisocyanates, and polyarylene polyisocyanates, or polycarboxylic acid anhydrides such as phthalic anhydride, methylnadic anhydride, and pyromellitic dianhydride. Those thermoplastic resins possessing olefinic unsaturation can also be cured by heating with air or other sources of chemical free radicals. Demonstrations of utility for the products of the process of this invention are to be illustrated in the examples.

Further, the polyester can be coated on metal substrates. After drying or curing, the film is usually hard and strong and quite distensible. These properties are fairly typical for so-called "low baking" industrial enamels. An often employed metal is aluminum. Note, these coatings form very attractive films.

The advantages of this invention are further illustrated by the following examples. The reactants and the proportions and other specific conditions are presented as being typical and should not be construed to limit the invention unduly.

EXAMPLE I 29.5 grams of succinic acid were dissolved in 200 milliliters of distilled N-methyl-2-pyrrolidone by heating to 100–110° C. under nitrogen. 1.40 grams of potassium hydroxide were added and dissolved by increasing the temperature to 120–130° C. 93.0 grams of commercial diglycidyl ether of 4,4'-isopropylidenediphenol were dissolved in 200 milliliters of additional N-methyl-2-pyrrolidone at room temperature and this solution was added to the reaction mixture in increments over a 30 minute period. The reaction mixture was heated at 160–165° C. for a total of 4 hours. Then the reaction mixture, at room temperature, was poured into cold tap water causing precipitation of the polymer as a semi-solid. The crude polymer was shredded in a Waring blender with several additional portions of water and the solid wet crumbs were vacuum dried at 150° C. for 16 hours. The final dried product was a dark brown, clear, hard, resinous solid, soluble in an equal parts by weight mixture of acetone and methyl alcohol, having a softening range of 70–80° C. and an inherent viscosity of 0.32 in m-cresol at 30° C. The recovered product yield was 90 percent based on a theoretical value. Infrared analysis showed strong evidence for ester linkages and free hydroxyl groups.

EXAMPLE II

The conditions described in Example I were repeated except thaat sulfolane was used as a solvent instead of N-methyl-2-pyrrolidone. Isolation workup of this product was the same as in Example I except the vacuum drying was carried out over a period of 48 hours instead of 16 hours. Under these conditions the final dried polymer of light straw color was incompletely soluble in a wide range of solvents examined, having been partially crosslinked during the drying process.

EXAMPLE III

A third polymerization process was carried out under the same general conditions of Example I except that sulfolane was employed as the polar organic solvent and isophthalic acid was employed as the dicarboxylic acid. The reaction mixture after 4½ hours was a pale straw colored viscous liquid. Vacuum drying for 72 hours at 70–80° yielded a light tan resinous solid (93% of the theoretical yield) that was readily soluble in equal parts mixed solvent composed of toluene-acetone-methyl alcohol. Melting point was 100–110° C. and inherent viscosity was 0.27 in m-cresol at 30° C.

EXAMPLE IV

Using sebacic acid in a procedure similar to that described in Example III the reaction was again carried out except that heating was stopped in the latter stages and several hundred milliliters of acetone were added. This resulted in the formation of a clear solution of fluid consistency with no gel present. After recovery and drying for 48 hours at 70–80° C., the product was partially gelled.

EXAMPLE V

To 300 milliliters of distilled sulfolane was added 17.36 grams of allylsuccinic anhydride, 2.25 grams distilled water sufficient to convert the anhydride to the acid form, 0.70 gram of potassium hydroxide, and 20.75 grams of isophthalic acid. This mixture was heated under nitrogen to 130–140° C. To this was added a solution of 93.0 grams of commercial diglycidyl ether of 4,4'-isopropylidenediphenol in 300 milliliters of distilled sulfolane. Addition was complete in 1 hour and the temperature was raised to 150–160° C. for two additional hours. The pale, amber, clear viscous reaction mixture was precipitated in water to yield a flaky solid which shredded easily in a Waring blender. The wet crumb was vacuum dried at 50–60° C. for 72 hours and again a partial gel phase was obtained.

EXAMPLE VI

The run of Example V was repeated with the additional step of adding 1.5 grams of glacial acetic acid to the hot reaction mixture at the end of the normal polymerization period and holding for one hour at 135° C. before workup. Precipitation, water washing and vacuum drying of the product yielded a completely acetone soluble product (90–95% of the theoretical yield) in the form of a soft resin. Inherent viscosity of this polymer was 0.45 in m-cresol.

EXAMPLE VII

The product of Example VI was examined for its coating properties on metal substrates. A 30% solids solution of polymer in acetone was coated on solvent cleaned aluminum test panels. A coating film was air dried 10 minutes and oven baked 30 minutes at 100° C. These curing conditions are fairly typical of those used for so-called "low-baking" industrial enamels. A hard, clear coating film resulted which was no longer acetone soluble. Pencil hardness was 2H (medium hardness range) and the coating rated a reversed impact value of 10 foot-pounds.

EXAMPLE VIII

An isocyanate cure was performed by adding a stoichiometric amount of 2,4-tolylene diisocyanate to the solution of polymer in acetone from Example VII. This mixture was coated on aluminum and curved by a 10 minute air dry and 30 minute oven bake at 100° C. The resulting coating was clear and extremely hard (7H pencil hardness rating) and showed a reversed impact value of 35 foot-pounds.

EXAMPLE IX 93.0 grams of commercial diglycidyl ether of 4,4'-isopropylidenediphenol were dissolved in 400 milliliters of xylene heated to about 140° C., and 10 drops of 2,4,6-tris(dimethylaminomethyl)phenol were added as catalyst. Solid succinic acid (29.5 grams) was then added gradually over a period of one hour, yielding a reaction mixture containing solid sediment particles. After two hours a rubbery gelatinous lump formed which was gelled polymer. This example shows that it is necessary to employ a solvent that can dissolve both the dicarboxylic acid and the diepoxide.

Although this invention has been described in considerable detail, it must be understood that such detail is for the purpose of illustration only and that many variations or modifications can be made by one skilled in the art without departing from the scope and spirit thereof.

I claim:
1. In a process for producing gel free resinous hydroxy-substituted polyesters by reacting a diepoxide which is essentially free of substituents capable of reacting with a —COOH radical other than hydroxyl radicals and epoxy groups with a dicarboxylic acid in the presence of a basic catalyst comprising a tertiary amine or an alkali metal hydroxide, the improvement comprising carrying out said reaction in a medium selected from the group consisting of:
   (a) a saturated sulfone having 2 to 10 carbon atoms, wherein said sulfone may be acylic or cyclic; and
   (b) a saturated N,N-dihydrocarbyl substituted amide having 3 to 10 carbon atoms, wherein said amide may be acyclic or cyclic and recovering the resulting polyester.

2. A process according to claim 1 wherein the temperature ranges from 50 to 250° C., the time ranges from 5 minutes to 24 hours, the mole ratio of said diepoxide to saidd icarboxylic acid ranges from 0.95:1 to 1.05:1, and the pressure is sufficient to maintain the reaction mixture in the liquid phase.

3. A process according to claim 1 wherein the amount of said polar organic solvent ranges from 0.8 to 12 times the combined weight of said diepoxide and said dicarboxylic acid and the amount of said basic catalyst ranges from about 0.5 to 2 percent by weight of the combined weight of said diepoxide and said dicarboxylic acid.

4. A process according to claim 1 wherein said diepoxide has the formula

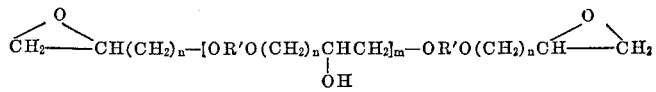

wherein $n$ is an integer from 1 to 10, R is a divalent organic radical and said dicarboxylic acid has the formula R'''(COOH)$_2$ wherein R''' is a carbon-to-carbon bond, a divalent saturated aliphatic radical, a divalent ethylenically unsaturated aliphatic radical, or divalent aromatic radical.

5. A process according to claim 1 wherein said diepoxide can be represented by the formula

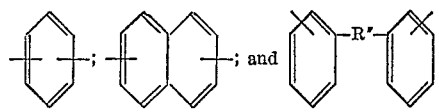

wherein $n$ is an integer from 1 to 10, $m$ is an integer from 0 to 20, and R' is selected from the group consisting of

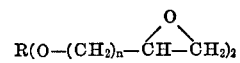

wherein R'' is selected from the group consisting of a carbon-to-carbon bond, a divalent aliphatic radical, and a divalent aromatic radical.

6. A process according to claim 5 wherein said diepoxide is diglycidyl ether of 4,4'-isopropylidenediphenol and said dicarboxylic acid is succinic acid, adipic acid, isophthalic acid, allylsuccinic acid, sebacic acid, or a mixture of allylsuccinic acid and isophthalic acid.

7. A process according to claim 1 wherein said polar organic solvent is N-methyl-2-pyrrolidone or sulfolane.

8. A process according to claim 1 wherein said basic catalyst is an alkali metal hydroxide.

9. A process according to claim 1 wherein said basic catalyst is potassium hydroxide.

References Cited

UNITED STATES PATENTS

| | | | |
|---|---|---|---|
| 3,083,186 | 3/1963 | McGary et al. | 260—75 EP |
| 3,256,226 | 6/1966 | Fekete | 260—75 EP X |
| 3,304,344 | 2/1967 | Szawlowski | 260—47 EPCA X |

WILLIAM H. SHORT, Primary Examiner

L. P. QUAST, Assistant Examiner

U.S. Cl. X.R.

117—132 C; 260—32.8 R, 32.8 W, 33.4 R, 33.6 R, 47 EC, 47 CB, 75 EP, 75 NK, 78.4 EP